United States Patent
Van Coppenolle

(10) Patent No.: US 8,520,930 B2
(45) Date of Patent: Aug. 27, 2013

(54) METHOD AND COMPUTER PROGRAM FOR IMPROVING THE DIMENSIONAL ACQUISITION OF AN OBJECT

(75) Inventor: Bart Van Coppenolle, Linden (BE)

(73) Assignee: 3D Scanners Ltd., East Midlands Airport Castle Donington Derby (GB)

( * ) Notice: Subject to any disclaimer, the term of this patent is extended or adjusted under 35 U.S.C. 154(b) by 315 days.

(21) Appl. No.: 12/736,351

(22) PCT Filed: Apr. 2, 2009

(86) PCT No.: PCT/EP2009/053931
§ 371 (c)(1),
(2), (4) Date: Jan. 5, 2011

(87) PCT Pub. No.: WO2009/127526
PCT Pub. Date: Oct. 22, 2009

(65) Prior Publication Data
US 2011/0123097 A1 May 26, 2011

Related U.S. Application Data

(60) Provisional application No. 61/046,153, filed on Apr. 18, 2008.

(51) Int. Cl.
*G06K 9/00* (2006.01)
(52) U.S. Cl.
USPC .............................. 382/152; 382/100; 703/1
(58) Field of Classification Search
USPC ......................................................... 382/152
See application file for complete search history.

(56) References Cited

U.S. PATENT DOCUMENTS

| | | | |
|---|---|---|---|
| 5,978,748 A * | 11/1999 | Raab | 702/150 |
| 6,249,600 B1 | 6/2001 | Reed et al. | |
| 2002/0048015 A1 | 4/2002 | Drake, Jr. | |
| 2002/0169586 A1* | 11/2002 | Rankin et al. | 703/1 |
| 2005/0099637 A1 | 5/2005 | Kacyra et al. | |
| 2005/0276466 A1* | 12/2005 | Vaccaro et al. | 382/152 |
| 2006/0002504 A1* | 1/2006 | De Man et al. | 378/4 |
| 2006/0274327 A1 | 12/2006 | Bae et al. | |

FOREIGN PATENT DOCUMENTS

| | | |
|---|---|---|
| EP | 1 355 127 A2 | 10/2003 |
| JP | 06 249624 | 9/1994 |
| JP | 2002022424 A | 1/2002 |
| JP | 2006337355 A | 12/2006 |

OTHER PUBLICATIONS

The Japanese Office Action dated May 2, 2013 (with English translation), for related Japanese Application No. 2011-504408.

(Continued)

*Primary Examiner* — Hadi Akhavannik
(74) *Attorney, Agent, or Firm* — Amster, Rothstein & Ebenstein LLP

(57) ABSTRACT

The present invention relates to a method for improving the efficiency of dimensional acquisition of an object by a dimensional measurement device directed over the object, comprising the steps: a) directing the measurement device over the object to acquire its dimensions, b) providing an indication of the resolution of the acquired regions, c) re-directing the measurement device over at least part of the acquired regions indicating insufficient resolution according to predetermined criteria, d) updating the indication of the resolution of the acquired regions, and e) repeating steps c) and d) until sufficient resolution is indicated according to the predetermined criteria, thereby efficiently acquiring the dimensions of the object at sufficient resolution. It also relates to a computer program therefor.

12 Claims, 6 Drawing Sheets

(56) References Cited

OTHER PUBLICATIONS

Figure 1:
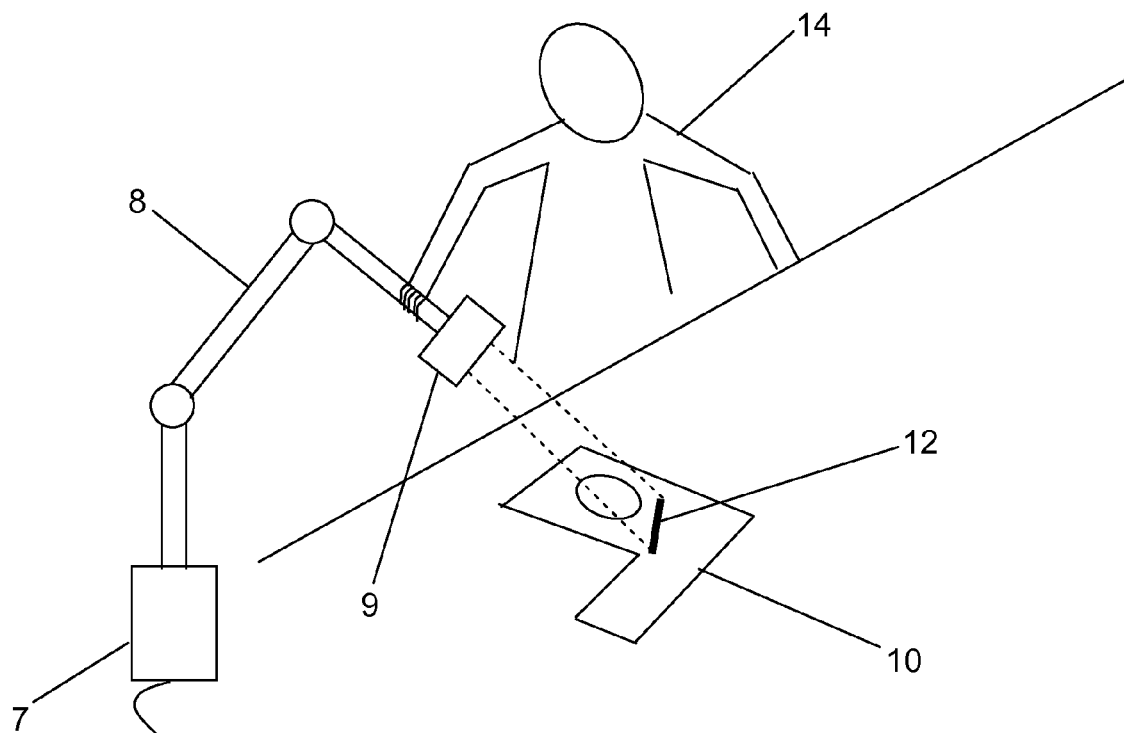
Figure 1:
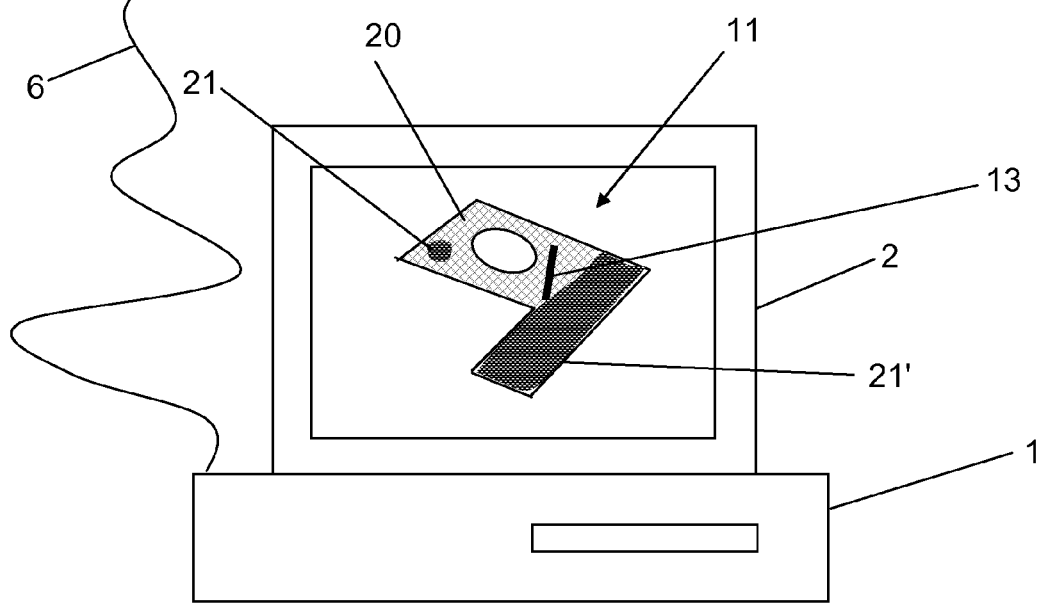

The International Search Report for PCT Application No. PCT/EP2009/053931, Jun. 2010.

The International Preliminary Report on Patentability for PCT Application No. PCT/EP2009/053931, Jun. 2010.

* cited by examiner

METHOD AND COMPUTER PROGRAM FOR IMPROVING THE DIMENSIONAL ACQUISITION OF AN OBJECT

This is a U.S. national phase of PCT Application No. PCT/EP2009/053931, filed Apr. 2, 2009, which claims the benefit of European Application No. 08154793.7, filed Apr. 18, 2008 and U.S. Provisional Application No. 61/046,153, filed Apr. 18, 2008.

BACKGROUND TO THE INVENTION

The invention relates to a method and computer program for the dimensional acquisition of an object required for reverse engineering or inspection tasks, which invention provides unskilled operators with an indication of acquisition quality the during the acquisition process. The inspection of physical objects usually comprises two different tasks: the acquisition of a numerical representation of an object, and the inspection of this numerical representation.

Dimensional acquisition (i.e. measurement) makes use of one or more dimensional measuring devices that are able to capture individual points on the surface of the object. Such dimensional measuring devices are well known in the art and might be, for example, a co-ordinate measuring machine arm (CMM arm) equipped with a laser scanner. CMM arms are manufactured by, for example, Faro Tech Inc, Hexagon Metrology AB or Metris. Laser scanners are currently manufactured by, for example, Faro Tech Inc, Perceptron Inc, Kreon Technologies, and Metris. A CMM arm is sometimes called a localizer because it is used to provide a 6 dimensional location (i.e. position and orientation) of the laser scanner. Other kind of localizers also exist such as conventional co-ordinate measuring machine (CMM) manufactured, for instance, by DEA, Mitutoyo, Wenzel, Zeiss, LK; or optical CMMs using light-emitting diodes (LEDS) or optical markers. Examples of optical CMMs include the Metris K600, laser trackers, laser radars. Apparatus combining a localizer and a scanner also exists such as in the Handyscan product of Creaform Inc.

In a laser scanner, a laser plane intersects an object and the intersection is captured by an imager apparatus that employs a CCD camera. Within the imager apparatus, the intersection is digitized in a series of 2D points and given the position reported by the localizer, these 2D points are converted to 3D points representing points located on the surface of the object being acquired.

Other dimensional measurement devices can be used to acquire points on the surface of an object, such a tactile probe (hard probes of deflecting probes) that acquires one point at a time; scanning probes that acquire points continuously while the probe is moving over the surface. Devices projecting structured lights also exist that are able to acquire points on the surface of an object (e.g., GOM systems).

Computed tomography (CT) scanners or robot CMM arms are also measuring devices able to measure points on the surface of the object. A CT scanner is also able to measure points on the internal surfaces of the object.

The resulting acquisition comprises a point cloud (a set of 3D points) or any other alternative representation such as stereolithography (STL) meshes, surfaces or simply raw range images. In the case of CT scanners, the result of the acquisition may be 3D voxel data where each voxels contains information about the density of the object.

These measuring devices may either be considered as manual devices i.e. a user is required to manipulate the device across the object to acquire data; alternatively, they may be automatic i.e. the measuring device, based on a definition of a path, automatically passes over the object to acquire data without human intervention.

A computer aided design (CAD) model is a computer generated numerical representation of an object to be manufactured. It results from building the object within the confines of a software CAD application rather than using dimensional acquisition data directly. A CAD model can be a represented by a set of points (a point cloud), a set of polygons (such as an STL mesh) or one or more surfaces (Non-uniform rational B-spline (NURBS), B-Rep, analytical surfaces). The CAD model may also contain additional information that is critical for the manufacturing process of the actual object. Such information is usually manufacturing tolerances and can be defined using the Geometric Dimensioning and Tolerancing (GD&T) ASME Y14.5M-1994 standard. The CAD model may also contain information of features such as edges, circles, holes, slots, round slots. These features may be represented by polylines, analytical curves, NURBS curves, etc . . .

During the inspection tasks, specific characteristics of an object can be measured. For example, a user may want to verify the diameter of a circular hole or its position relative to another hole. He may also want to verify the circularity of the hole. Another example of inspection task consists in the verification of the thickness between two surfaces. The user may also simply measure the distances between representative points of the surface. When a CAD model is available for the inspection tasks, the point cloud may be compared entirely with the CAD model, features of the CAD model (nominal features) may be compared with features of the point cloud (actual features).

The process of acquisition and inspection may be performed according to two different workflows. In a first workflow, the acquisition and inspection tasks are decoupled. Here, a shop floor worker simply acquires points on the surface of the object in order to capture the geometry. When the acquisition is complete, the point cloud is transferred to the inspection specialist, usually a skilled worker, who will perform the inspection tasks. This workflow suffers from some drawbacks. Since the shop floor worker is not guided during the acquisition process, he may provide a point cloud that does not cover the entire CAD model. Also, some regions may not be acquired with insufficient accuracy or resolution. For example, by using a CMM arm equipped with laser scanner, the shop floor worker is responsible to move the scanner with the correct speed. If he is moving too fast, the resulting cloud will be undersampled and will miss small features (small holes, fillets, edges, . . . ). Therefore, during the subsequent inspection, some inspection tasks will not be possible or will provide results that are not reliable. The only remedy is to go back to the shop floor and perform additional measurements which cost time or may even be impossible if the object has already been displaced, shipped to another location. To avoid this problem, the shop floor worker usually tends to over-sample the object, which means that too many points are acquired. The resulting point clouds constitute very large files, containing redundant information. Both the acquisition tasks and the inspection tasks require, therefore, extra time, and provide unwieldy files.

In a second (alternative) workflow, the acquisition and inspection tasks are performed sequentially, in that a part of the object is acquired, the acquisition stopped and an inspection is performed on that part. The process of stop/start acquisition and inspection is repeated until the inspection of the object is complete. In an example of the procedure, the user is first required to measure points corresponding to a specific feature (e.g. a slot) on the object, then to stop acquisition in order to create this feature using the measured points. After acquiring several of these features, the user needs to stop acquisition again to proceed to an alignment task where the position of the objects referenced according to the reference system of the measuring machine is related to the reference system of the CAD model expressed in part coordinate system. In the subsequent steps, the user is guided for the acquisition of the remaining points needed for the complete inspection of the part, stopping between sessions of acquisition and inspection. An example of such workflow is described in e.g. US 2006/0274327 where the operator is guided through a series of acquisition and inspection tasks. In US 2006/0274327, a new acquisition may be automatically requested to the operator if the inspection has not succeeded.

The second workflow requires a skilled worker since he needs to understand the both the acquisition and inspection processes i.e. to acquire points with sufficient density and accuracy, and to then to perform feature detection, alignment, tolerances, etc as part of the inspection process. For example, some computer programs readily allow points to be continuously compared with a CAD model (assuming the worker has already aligned the measuring system with the CAD model). However, these programs give a false sense of safety since they provide information on what has been acquired but not on what is missing or on the quality of the acquired data.

In this workflow, the inspection software and acquisition software are identical to that of the first workflow, thus creating complexity since the user needs to master two complex software applications. Further, time is wasted because the user has to stop acquisition and switch back and forth between acquisition and inspection software application and continuously transfer the newly acquired 3D points. Finally, the user must be able to read and understand the CAD data, correctly identify on the object the features or the location where points need to be acquired.

The acquisition of points on the surface of 3D objects may also be used in the context of reverse engineering. Here, the acquisition is guided by the need to acquire geometric information on the surface of the object with sufficient density as to be able to create a global numerical model, e.g. by means of NURBS surfaces or STL mesh. Too few acquired points will create holes in the model which will result in a model of poor quality where details are missing. Too many points will slow down the reverse engineering tasks since most of the reverse engineering operations require a time proportional to the number of points. Such a model can be later used for rapid prototyping, or visualization.

SUMMARY OF THE INVENTION

The present invention concerns a new method and computer program for improving the accuracy and speed of dimensional acquisition of a 3D numerical representation of an object; the invention allows subsequent tasks such as inspection or reverse engineering to become possible and efficient.

The present invention provides a method for improving the efficiency of dimensional acquisition of an object by a dimensional measurement device directed over the object, comprising the steps:
a) directing the measurement device over the object to acquire its dimensions,
b) providing an indication of the resolution of the acquired regions,
c) re-directing the measurement device over at least part of the acquired regions indicating insufficient resolution according to predetermined criteria,
d) updating the indication of the resolution of the acquired regions, and
e) repeating steps c) and d) until sufficient resolution is indicated according to the predetermined criteria,
thereby efficiently acquiring the dimensions of the object at sufficient resolution.

Alternatively expressed, the invention provides a method for improving the efficiency of the dimensional acquisition of an object by a dimensional measurement device directed over the object, comprising:
directing the measurement device over regions of the object to acquire their dimensions,
providing, during acquisition, a continuous indication of the resolution of the acquired regions, and
directing the measurement device, during acquisition, over regions indicating insufficient resolution according to predetermined criteria,
thereby efficiently acquiring the dimensions of all regions of the object at sufficient resolution.

The method thus provides feedback during acquisition. The feedback i.e. updating in step d) may be provided continuously, meaning at regular or irregular time intervals, for example at a certain frequency such as 1 Hz, 10 Hz, 10 kHz, or on user request (e.g. by pressing a button). A region has an ordinary meaning, herein, referring to a part of the object being acquired. For example, a region may be defined as one or more points, curves or surfaces. The regions need not necessarily cover the entire object. For example, if an inspection task is restricted to the determination of a single circular feature, one single region defined around this feature is required. The indication may show whether the resolution is sufficient or insufficient according to predetermined criteria. It is noted that resolution preferably refers to an acquired region, and not to non-acquired (not yet scanned) regions of the object. A sufficient resolution of a region means that the acquired data provides enough information to be able to perform the subsequent tasks e.g. detect a circular hole and verify if the diameter of the hole is within prescribed tolerance compare to the nominal diameter. An insufficient resolution, therefore, implies the opposite. For example, if the noise is zero, sufficient resolution for the inspection of a circular hole can be expressed as at least 3 points, since 3 points are needed to describe a circle. If the noise is 25 mu and the tolerance 50 mu, sufficient resolution could mean at least 20 points since using 20 points there is more than 95% chance of answering correctly to the question whether the diameter is within tolerance. The sufficiency or insufficiency is thus determined by criteria that may vary according to the shape of the regions being acquired, according to the measurement device, subsequent tasks to be performed (such as inspection or reverse engineering) and other factors. The criteria may be predetermined dynamically during acquisition, or set by the user prior to acquisition. The indication of resolution provides a sign to the user or automated measurement system to direct the measurement device, during acquisition, over regions indicating insufficient resolution according to these predetermined criteria.

The invention also provides a computer program stored on a computer readable medium capable of performing the method as described above. The invention provides a computer program for improving the dimensional acquisition of an object by a dimensional measurement device directed over the object, that comprises a "coverage module" (or coverage software routine) and "feedback module" (or feedback software routine) stored on a computer readable storage medium—explained in detail below. The program runs on a processing means such as a computer during the acquisition process. The coverage module receives the acquired data of the measuring device at regular intervals and estimates which regions of a CAD model are sufficiently covered by the acquired data and/or which regions of the CAD model have insufficient coverage. Coupled to the coverage module, the feedback module provides feedback to the user or to the measuring device concerning the regions of the object where further data acquisition is needed and where data acquisition is sufficient. For example, if an operator uses a manual CMM arm with a laser scanner, the feedback module may present the CAD model on a computer screen where the regions with missing data are coloured red. Alternatively, when the measuring device is automatic (e.g. a conventional CMM with a laser scanner, or a robot CMM arm with a laser scanner), the feedback module may provide feedback in the form of a list of CMM/laser scanner locations required to acquire data in regions with insufficient resolution.

Using the invention with a manually-operated measuring device, a typical workflow entails that a CAD model is first loaded in the acquisition software, and the coverage module and feedback modules are started. If necessary, an optional alignment between the object in measuring device reference system and CAD reference system may be performed.

Prior to acquisition, a CAD model, or part of a CAD model, may be presented on the screen of the computer that is indicated with markings, for example, with red shading, meaning that no data has been acquired. The user is simply requested to acquire data on the object in any order. He may choose to proceed as a painter would proceed while painting the object. Regularly, the CAD model is re-rendered on the screen where regions having been acquired to sufficient resolution are indicated in an alternative way, for example being shaded green. At anytime during the acquisition, the user may look at the screen to identify the red regions and further acquire data on the corresponding location of the object. At the end of the process, the entire CAD model is coloured green and the acquisition may stop.

Alternatively, prior to acquisition, a CAD model may be presented on the screen of the computer that is indicated with markings, for example, with red shading, meaning that no data has been acquired. The user is requested to acquire data on the object in any order. He may choose to proceed as a painter would proceed while painting the object. Regularly, the CAD model is re-rendered on the screen where regions having been acquired to sufficient resolution are indicated in an alternative way, for example being shaded green. Those regions that have been acquired, but at insufficient resolution may be shaded in an alternative way, for example, amber, indicating of the resolution of the model in that region is insufficient and that the measurement device should be directed thereover. Those regions still require a first pass by the measurement device may be shaded red. At anytime during the acquisition, the user may look at the screen to identify the red regions which still require a first pass by the measurement device over the corresponding location of the object, amber regions which require further passes over the corresponding location of the object, and green regions that do not require any further passes by the measurement device. At the end of the process, the entire CAD model is coloured green and the acquisition may stop.

Based on the CAD model and the acquired data, the coverage module of the system computes whether a particular region or detail of the CAD model has been acquired with sufficient and/or insufficient resolution. A sufficient or insufficient resolution is determined by the shape of the object, the type of measurement device and the subsequent tasks to be performed on the object as mentioned elsewhere. Typically it is determined according to the number of points to be acquired on a particular region. For example, a density of one point every 1 $mm^2$ may be required by the user, and this represents part of the criteria. Alternatively, a varying point density may be chosen when more points are required in regions with higher curvature. Alternatively, a higher density of points may be asked along the edges of the features. Alternatively, the number of points may be dependent on a user given tolerance or in a tolerance present in the CAD file (CATIA) or according to GD&T requirements. Alternatively, the number of points may be adapted dynamically according to the type of probe. The use of an accurate touch probe will provide an accurate coverage, faster than a laser probe.

In the invention, the measuring device is preferably manual measuring device, either a CMM arm and a laser scanner, or a laser scanner combined with an optical CMM. In this case, the feedback module renders information on the computer screen. The user may also choose an automatic measuring device. In this latter case, the feedback model may directly drive the automatic measuring device and make it acquire data in the regions with insufficient coverage.

Some particular embodiments of the invention are described below:

One embodiment of the invention is a method as described above, wherein said indications are provided on a computer aided design, CAD model of the object.

Another embodiment of the invention is a method as described above, wherein the CAD model and indication of resolution for acquired regions of the object are displayed using a display means.

Another embodiment of the invention is a method as described above, wherein the indication of resolution comprises an indication of acquired regions having a sufficient and/or insufficient resolution according to said predetermined criteria.

Another embodiment of the invention is a method as described above, wherein acquired regions of sufficient resolution are indicated on the CAD model using a first marking, and acquired regions of insufficient resolution are marked on the CAD model using a second marking that is different from the first marking.

Another embodiment of the invention is a method as described above, wherein the indication of the resolution comprises an indication of acquired regions having the same resolutions.

Another embodiment of the invention is a method as described above, wherein the CAD model and indication of resolution for the acquired regions of the object are displayed using a display means and wherein regions having the same acquired resolution are indicated on the CAD model using a common marking, and where regions of differently acquired resolutions are marked with different markings.

Another embodiment of the invention is a method as described above, wherein the indication of resolution is further updated after the measurement device acquires a region that at least partially overlaps a previously acquired region.

Another embodiment of the invention is a method as described above, wherein the measurement device is a manually operated measurement device.

Another embodiment of the invention is a method as described above, wherein the measurement device comprises an optical scanner and either a co-ordinate measuring machine, CMM, arm or an optical CMM.

Another embodiment of the invention is a computer program stored on a computer readable medium, configured to perform a method described above.

Another embodiment of the invention is a computer program stored on a computer readable medium, for improving the dimensional acquisition of an object by a dimensional measurement device that is directed over the object, configured to:
a) receive three-dimensional data of the object from the measurement device directed over regions of the object,
b) provide an indication of the resolution of the acquired regions,
c) receive additional three-dimensional data of the object from the measurement device for at least part of the acquired regions indicating insufficient resolution according to predetermined criteria,
d) update the indication of the resolution of the acquired regions, and
e) repeat steps c) and d) until sufficient resolution is indicated according to the predetermined criteria.

Another embodiment of the invention is a computer program as described above, further comprising a coverage module configured to receive the three-dimensional data of the object from the measurement device during dimensional acquisition, and to provide the updated indication of the resolution of the acquired regions.

Another embodiment of the invention is a computer program stored on a computer readable medium, for improving the dimensional acquisition of an object by a dimensional measurement device that is directed over the object, comprising a coverage module configured to receive three-dimensional data of the object from the measurement device during dimensional acquisition, and to provide a continuously updated indication of the resolution of the acquired regions.

Another embodiment of the invention is a computer program as described above further comprising a feedback module configured to provide said indication of resolution of the acquired regions on a CAD model or as data to an automated measurement device.

Another embodiment of the invention is a computer program as described above, wherein the indication of resolution of the acquired regions comprises an indication of acquired regions having sufficient and/or insufficient resolution according to predetermined criteria.

Another embodiment of the invention is a computer program as described above, comprising a feedback module configured to provide said indication of resolution of the acquired regions on a CAD model, wherein acquired regions of sufficient resolution are indicated on the CAD model using a first marking, and acquired regions of insufficient resolution are marked on the CAD model using a second marking that is different from the first marking.

Another embodiment of the invention is a computer program as described above, wherein the indication of the acquisition resolution comprises an indication of acquired regions having the same resolutions.

Another embodiment of the invention is a computer program as described above, wherein acquired regions having the same resolution are indicated on the CAD model using a common marking, and where acquired regions of different resolutions are marked with different markings.

Another embodiment of the invention is a computer program as described above, further comprising a display means to display the resulting CAD model.

Another embodiment of the invention is a computer program as described above, further comprising a sub-routine to indicate when the dimensional acquisition of the object to a sufficient resolution according to predetermined criteria is complete for all acquired regions of the object.

FIGURE LEGENDS

FIG. 1 Schematic illustration of an embodiment of the method of the invention.

Figure 2:
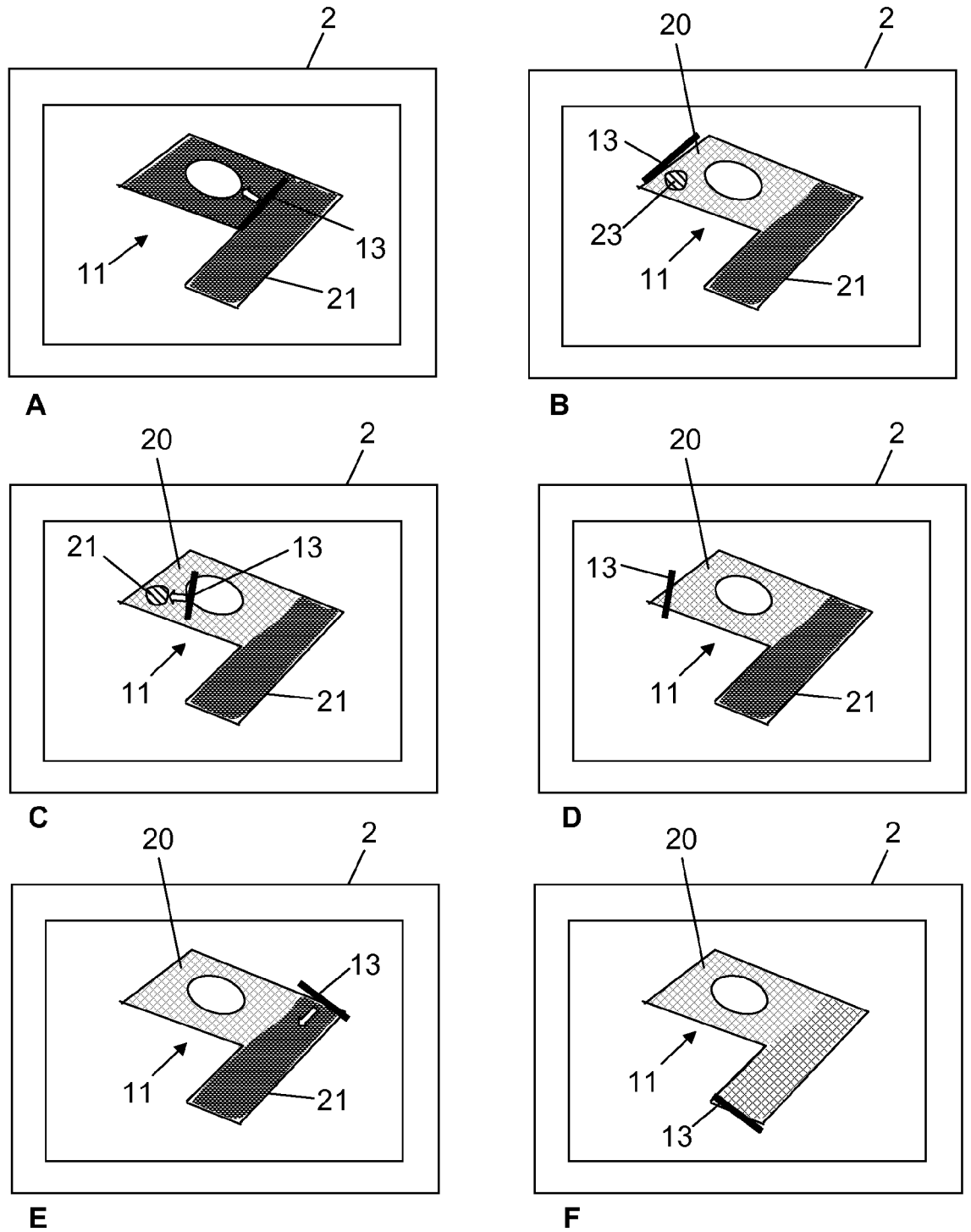

FIG. 2 Schematic illustration of the updates to the CAD model during acquisition of the object according to a method of the invention.

Figure 3:
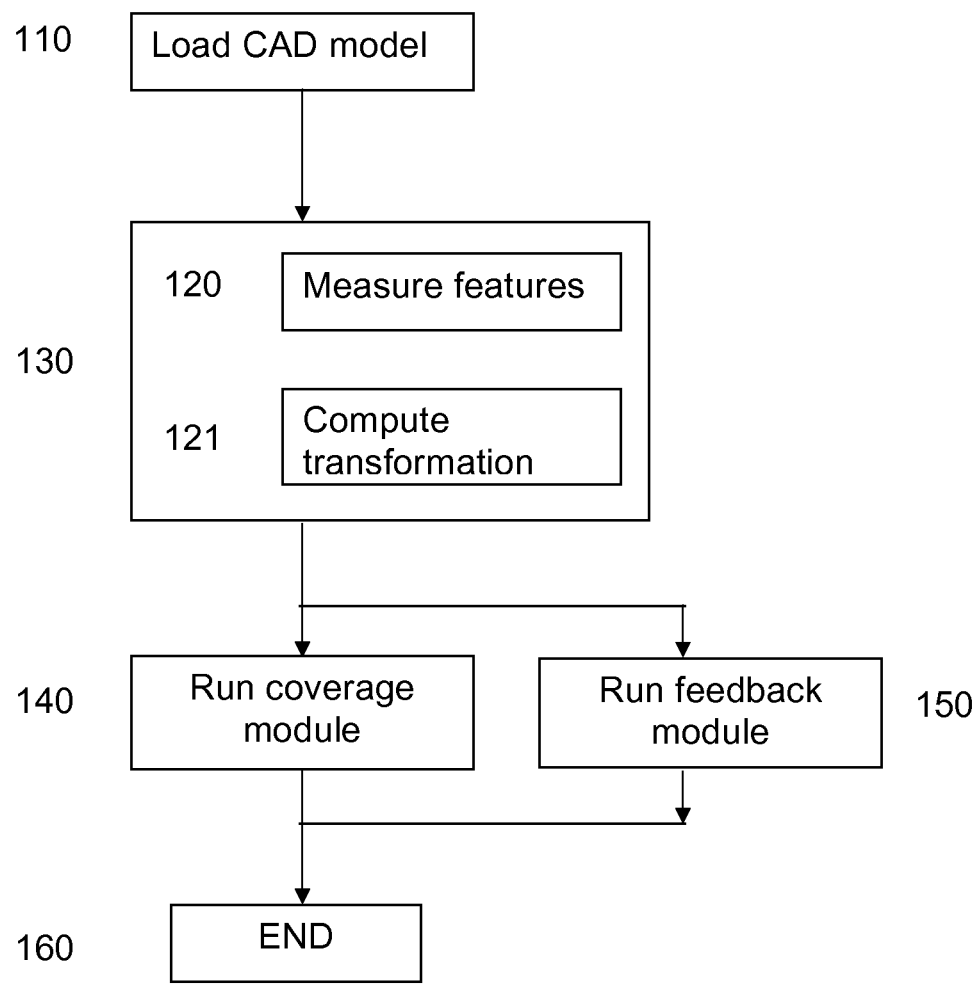

FIG. 3 Flow chart indication of an embodiment of the method of the invention.

Figure 4:
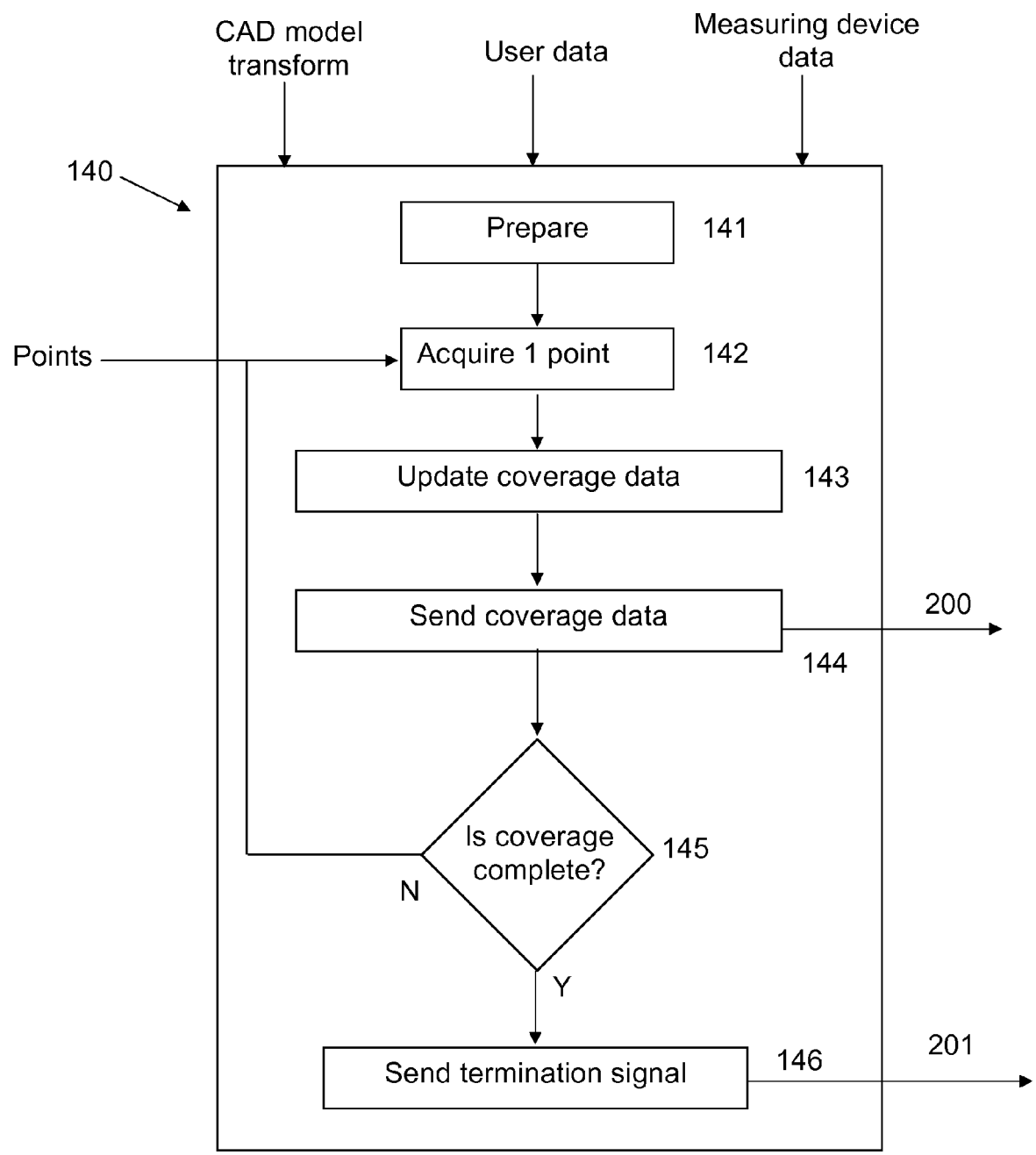

FIG. 4 Flow chart indication of an embodiment of the coverage module of the invention.

Figure 5:
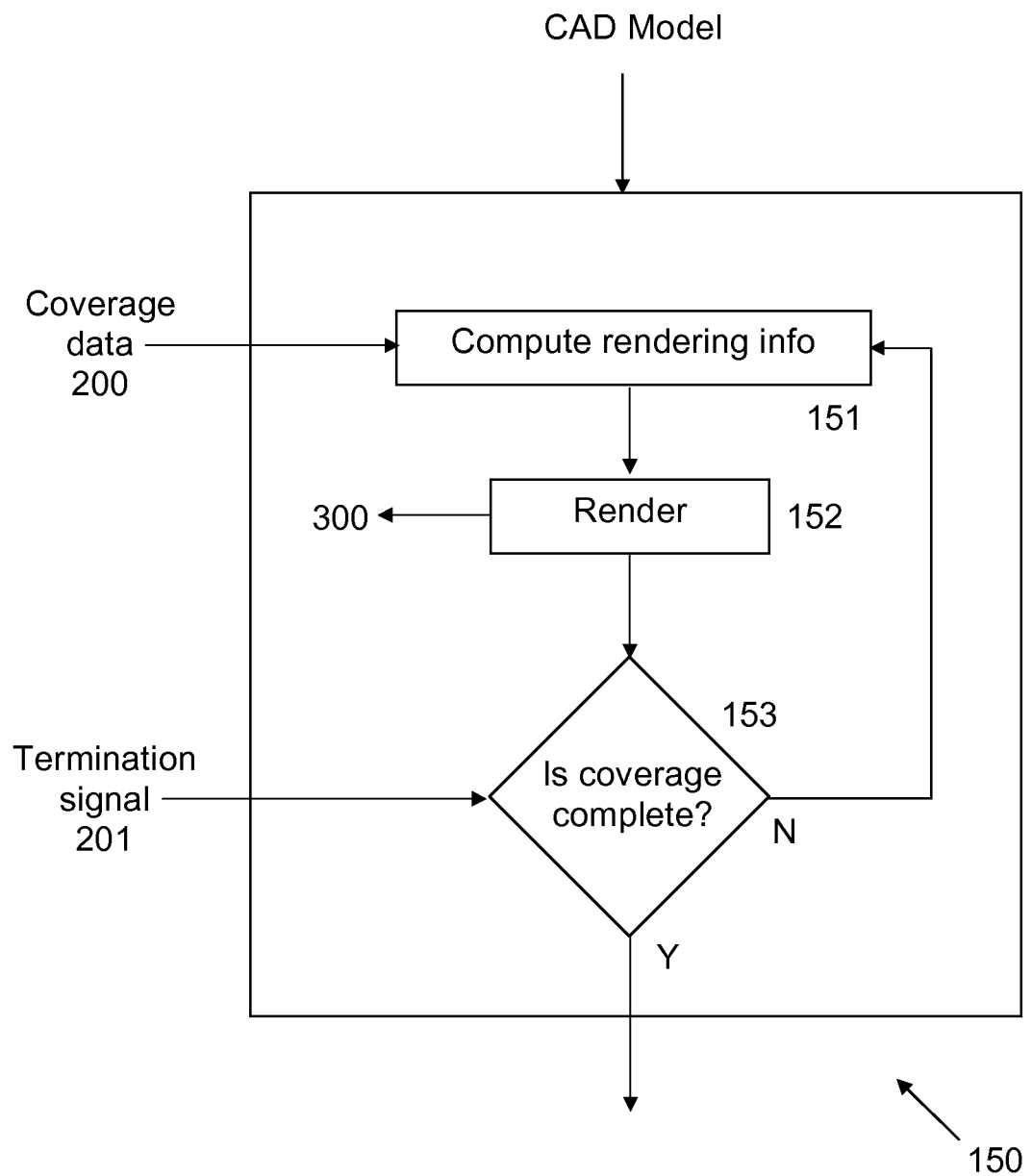

FIG. 5 Flow chart indication of an embodiment of the feedback module of the invention.

Figure 6:
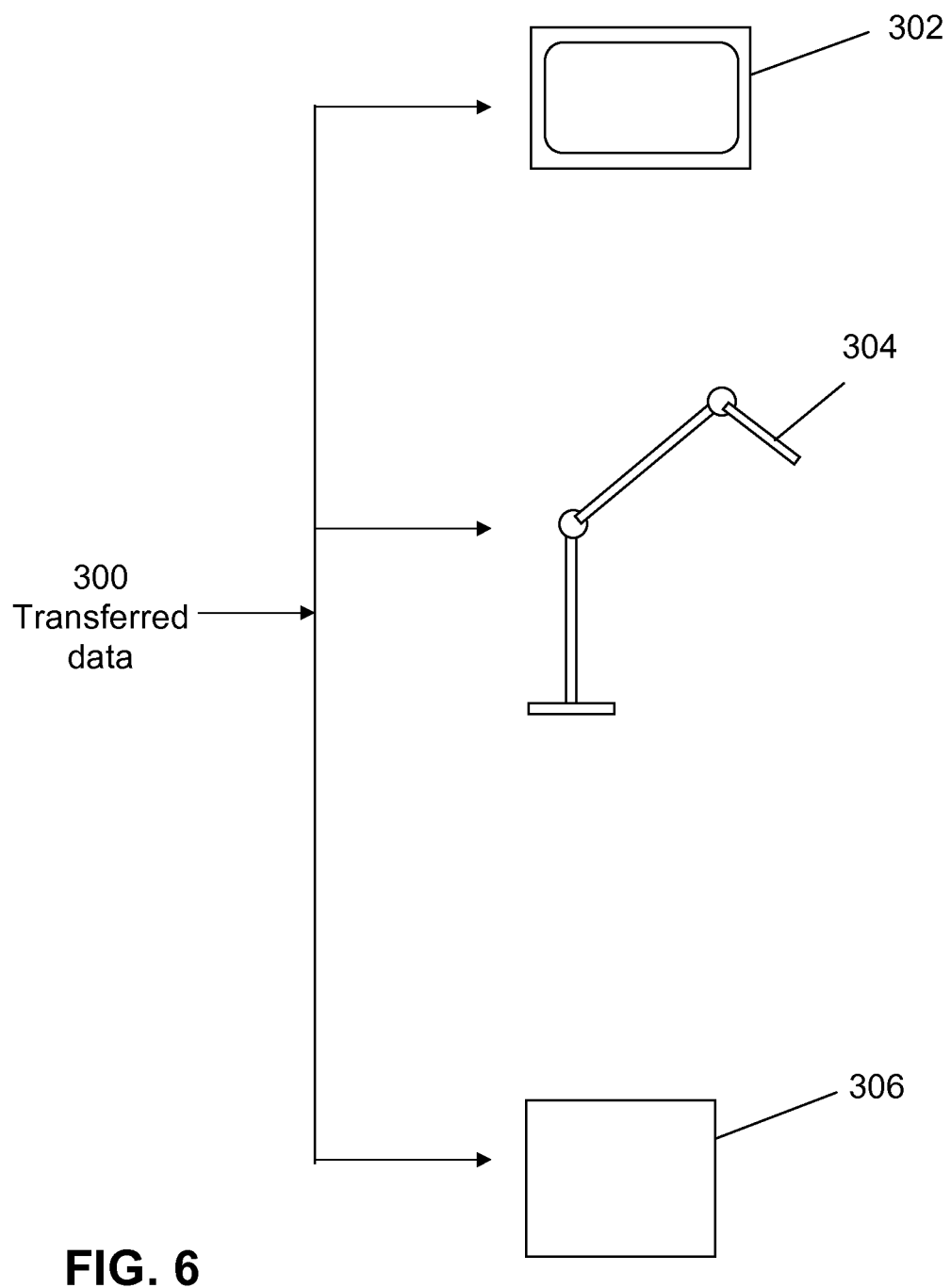

FIG. 6 Flow chart indication of the transfer of data from the rendering engine of FIG. 5 to a screen or a measurement device.

DETAILED DESCRIPTION OF THE INVENTION

Unless defined otherwise, all technical and scientific terms used herein have the same meaning as is commonly understood by one of skill in the art. The articles "a" and "an" are used herein to refer to one or to more than one, i.e. to at least one of the grammatical object of the article. The recitation of numerical ranges by endpoints includes all integer numbers and, where appropriate, fractions subsumed within that range (e.g. 1 to 5 can include 1, 2, 3, 4 when referring to, for example, a number of articles, and can also include 1.5, 2, 2.75 and 3.80, when referring to, for example, measurements). The recitation of end points also includes the end point values themselves (e.g. from 1.0 to 5.0 includes both 1.0 and 5.0)

The present invention provides a method for improving the efficiency of dimensional acquisition of an object by a dimensional measurement device directed over the object, comprising the steps:
a) directing the measurement device over regions of the object to acquire their dimensions,
b) providing an indication of the resolution of the acquired regions,
c) re-directing the measurement device over at least part of the acquired regions indicating insufficient resolution according to predetermined criteria,
d) updating the indication of the resolution of the acquired regions, and
e) repeating steps c) and d) until sufficient resolution is indicated according to the predetermined criteria,
thereby efficiently acquiring the dimensions of the object at sufficient resolution.

The updating of step d) takes account of the newly acquired data in step c). By repeating steps c) and d), the resolution of acquired regions is increased with each pass of the measurement device until it is sufficient according to the predetermined criteria. It will be appreciated that d) need not be performed directly after step c) i.e. intervening steps may be employed in which the measurement device is directed over regions other than those having been acquired and indicating insufficient resolution, for instance, regions not yet acquired.

In an alternatively expressed embodiment, the invention provides a method for improving the efficiency of the dimensional acquisition of an object by a dimensional measurement device directed over the object, comprising:
directing the measurement device over regions of the object to acquire dimensions of the regions, providing, during acquisition, a continuous indication of the resolution of the acquired regions, and directing the measurement device, during acquisition, over regions indicating insufficient resolution according to predetermined criteria, thereby efficiently acquiring the dimensions of all regions of the object at sufficient resolution.

The method thus provides feedback during acquisition of data, which feedback is a time-continuous indication of the acquisition resolution of the regions, more preferably of regions having sufficient or insufficient resolution according to predetermined criteria. It provides an indication to the user or automated measurement system to direct the measurement device, during data acquisition, over regions indicating insufficient resolution according to these predetermined criteria. The steps above are useful for acquiring the dimensions of an object at a resolution suitable for a subsequent inspection; it avoids discovery of insufficient resolution at the costly inspection stage.

The invention also relates to a computer program for improving the dimensional acquisition of an object by a dimensional measurement device that is directed over the object, comprising a "coverage module" configured to receive at least three-dimensional data of the object during dimensional acquisition, and to provide, during dimensional acquisition, a continuous indication of acquisition resolution of the object, whereby regions having the sufficient resolutions are indicated for the object.

The computer program may further comprise a "feedback module" configured to receive the indication of the acquisition resolution for regions of the object and to provide said indication on a CAD model.

As mentioned elsewhere, the task of dimensional acquisition is known in the art, and makes use of one or more dimensional measuring devices that are able to capture individual points on the surface of the object. They generally comprise a localizer that accurately reports the position of a measurement probe. Dimensional measuring devices are well known in the art and any are within the scope of the invention. Examples include a CMM arm (manufactured by, for example, Faro Tech Inc, Hexagon Metrology or Metris) equipped with a laser scanner (manufactured by, for example, Faro, Perceptron, Kreon, and Metris). Other examples include a conventional CMM (manufactured, for instance, by DEA, Mitutoyo, Wenzel, Zeiss, LK) or an optical CMM equipped with a measurement probe.

In a laser scanner, elaborated elsewhere, a laser plane is projected onto an object and the projection is captured by an imager apparatus that employs a charged-couple device (CCD) camera. Within the imager apparatus, the projection is digitized into a series of 2D points and given the position reported by the localizer, these 2D points are converted to 3D points representing points located on the surface of the object being acquired.

Other dimensional measurement devices can be used according to the invention to acquire points on the surface of an object, such those comprising a tactile probe (hard probes or deflecting probes) that acquires one point at a time; such those comprising a scanning probe that acquire points continuously while the probe is moving over the surface. Devices projecting structured lights also exist that are able to acquire points on the surface of an object (e.g. manufactured by GOM systems).

Other dimensional measurement devices according to the invention include computed tomography (CT) scanners or robot CMM arms. A CT scanner is also able to measure points on the internal surfaces of the object.

Other dimensional measurement devices can be used according to the invention to acquire dimensional data in a form other than points on the object surface. U.S. Pat. No. 6,616,617 discloses a method where a laser scanner provides directly triangle strips. Computer tomography scanners may provide voxel (volumetric) information.

These dimensional measurement devices may be equipped with additional probes to obtain additional information during the acquisition. Examples of such probes include colour cameras, temperature sensors or ultrasound sensors for acquiring wall thickness information. It will be understood, therefore, that acquisition may not be limited to surface dimensional measurement, but may include also capture of color, texture and depth (thickness) information.

These measuring devices may be manually operated devices i.e. a user is required to manipulate the device over the object to acquire data; alternatively, they may be automatic i.e. the object and measurement device move automatically relative to each other. In the latter case, the measuring device, based on a definition of a path, may automatically pass over the object to acquire data without human intervention. Alternative, the measurement device may be static while the object itself is in movement, for example by use of a rotary table.

The resulting acquisition comprises a point cloud (a set of 3D points) or any other alternative representation such as STL meshes, surfaces or simply raw range images. In the case of CT scanners, the result of the acquisition may be 3D voxel data where each voxels contains information about the density of the object. When additional probes are used, the resulting acquisition also includes the additional information provided by the additional probes.

Reference is made in the description below to the drawings which exemplify particular embodiments of the invention; they are not at all intended to be limiting. The skilled person may adapt the method and program and substitute components and features according to the common practices of the person skilled in the art.

The invention is described in greater detail with reference to FIG. 1. The object 10 that needs to be acquired is placed in the measuring volume of the measuring device which comprises a laser scanning probe 9 attached to a CMM arm 8 fixed to a base 7. A computer program, stored on a computer readable medium, instructs a processing device 1 to communicate with the CMM arm 8 and the laser scanner 9 typically via a communication cable 6. The program is able to receive data from the CMM arm 8 and the laser scanner 9 and convert the data to 3D data representing points on the external (or internal surfaces) of the object. A CAD model 11 is loaded into the program and displayed on the computer display 2. The operator 14 manually passes the probe 9 over the object 10; a laser line 12 is projected on the object 10, and its corresponding numerical representation 13 is displayed on the CAD model 11 which line is detected and establishes the measurements of the object. Prior to acquisition, the CAD model 11 has entirely (not shown) a dark shading indicating the regions to be acquired by passing the probe. As the acquisition progresses, the dark shading 21, 21' is replaced by regions of lighter shading 20, indicating that the resolution of the acquisition has met or exceeded predetermined criteria in these lighter 20 regions. By observing the computer display 2 during acquisition, the operator 14 recognizes the regions 21, 21' that need to be passed or passed again with the probe 9.

An example of how the model is updated during measurement is given in FIGS. 2A to F. A CAD model 11 is loaded into the program and displayed on the computer display 2. In FIG. 2A, the CAD model has entirely dark shading 21 indicating the regions not yet acquired by passing the probe. The operator manually passes the probe in the direction of the arrow over the object. The CAD model updates in FIG. 2B; the dark shading 21 is replaced by regions of cross-shading 20, indicating that the resolution of the acquisition has met or exceeded predetermined criteria. It is also replaced by a region of hatched shading 23, indicating said region has been acquired, but the resolution of the acquisition has not met predetermined criteria. The operator manually redirected the probe over the acquired region 23 indicating insufficient resolution in the direction of the arrow in FIG. 2C. The CAD model updates in FIG. 2D; the hatched shading is replaced by a region of cross-shading 20, indicating that the resolution of the acquisition has now met or exceeded predetermined criteria. The operator manually redirected the probe in the direction of the arrow over a previously unacquired region 21 in FIG. 2E. The CAD model updates in FIG. 2F; the dark shading is replaced by a region of cross-shading 20, indicating that the resolution of the acquisition has met or exceeded predetermined criteria. Thus, by observing the updating display 2 during acquisition, the operator recognizes the regions that need to be passed or passed again with the probe 9.

As mentioned elsewhere, prior to the acquisition, the user may first load a CAD model 11 representing the object into the computer program. Such a CAD model may be any kind, for example, it may be defined as an STL model, a NURBS surface using a B-rep representation, analytical surfaces or any other format suitable to represent surfaces, curves or points numerically. For example, the CAD model may have been generated using the CATIA system developed by Dassault Systèmes. The CAD model may also be a point cloud or a mesh of a previously acquired object. In addition to the mere representation of the surfaces of the object, the CAD model may also contain additional information on how the object needs to be inspected. An example of such additional information is the tolerances on the features such as defined by GD&T standard defined in the ASME Y14.5M-1994.

With reference to FIG. 3, after the user has loaded the CAD model 110 he may optionally align 130 the physical object with the CAD model prior to acquisition. To do this, he first measures features 120 of the object, for example, by first measuring and detecting three circles of the object, selecting the corresponding circles on the CAD model and using standard alignment techniques, compute a transformation matrix 121 that positions the actual circles onto the corresponding nominal circles. This may be performed by the computer program of the invention. Numerous other techniques also exist to produce an initial alignment. For example, other type of features, such as planes may be used. The transformation matrix may be read from a file (if more than one similar objects needs to be scanned, an alignment is only performed once and saved to disk). The transformation may be manually entered via a keyboard. The user may also choose to manually align a portion of the actual model with the CAD model on the screen using his mouse while the computer software incrementally updates the resulting transformation.

When the optional alignment 130 is complete, the coverage 140 module of the present invention provides a continuous and updated coverage information 200 which information comprises an indication of the regions of the object that have been acquired with sufficient and/or insufficient resolutions. Regions of sufficient or insufficient resolution may be calculated according to predetermined criteria as mentioned earlier. The coverage information 200 is sent to the feedback 150 module for presentation of a CAD model. Regions of sufficient resolution maybe indicated on the CAD model using a first marking (e.g. green), and regions of insufficient resolution may be marked on the CAD model using a second marking (e.g. red) that is different from the first marking.

With reference to FIG. 4, the coverage module 140 receives a description of the CAD model, optional user parameters and optional information about the measuring device. During a typical process, the coverage module 140 receives data information 142 (e.g.

points, colour, . . . ) from the measurement device at regular intervals. In response to this, the module 140 updates 143 the coverage information, which information 200 can be sent 144 to the feedback module 150 where it can be presented on the CAD model. Using the updated coverage information, the coverage module 140 is able to identify 145 whether the current set of acquired points is sufficient to describe accurately a portion of the CAD model. In addition, the coverage module 140 is able to provide information on the portion of the CAD model that is sufficiently acquired or on the portion of the CAD model that is not sufficiently acquired according to predetermined criteria. If coverage is complete (Y) then a termination signal 201 can be sent 146, otherwise (N) the module 140 continues to process information received from the measurement device.

If the CAD model is an STL mesh, the coverage information 200 may comprise a values ranging from 0 to 100% for each triangle of the mesh which values correspond to the resolution of the triangle acquired. A value of 0 may mean that the corresponding triangle on the object has not been sampled yet while a value of 100% may mean that the corresponding triangle has been fully sampled. On request from the feedback module 150 or at its own frequency, the coverage module 140 may send 144 the coverage information 200 to the feedback module 150. This information may concern the entire CAD model, or the information modified since the previously sent information.

The feedback module 150 runs concurrently with the coverage module either on the same computer or on another computer. It may be linked to a computer screen as shown in FIG. 1 and be able to render information on the screen. With reference to FIGS. 5 and 6, after reception of coverage information 200 from the coverage module 140 and using the geometrical information of the CAD model, the feedback module 150 computes 151 rendering information that is sent to the rendering engine 152. The render engine 152 transforms the information into, for example, into a rendered CAD model for transfer 300 to a screen 302 for display as shown in FIG. 6, additionally or alternatively into machine location information for transfer 300 to the automatic measurement device where employed such as a controller for a CMM arm 304, or to any other utilized automatic measurement device 306.

Where the rendering engine 152 render CAD model for display on a screen 203, the model may be rendered with various indications, preferably coloured shading, mesh or points to indicate coverage information. For example, regions that are sufficiently covered may be coloured green and the remainder of the CAD model, not sufficiently covered, may remain red. It is within the scope of the invention that more than two colors are used denoting partial coverage e.g. green for portions sufficiently covered, red for portions not yet covered, amber for portions covered but not at sufficient resolution. Alternatively, a continuous colour map may be used indicating coverage resolution. In a further alternative, the feedback module 150 may render only the portions that are not covered. The portions sufficiently covered are not rendered or may be rendered with some transparency factor. Instead of using colors, the feedback module may use different textures to represent the covering information. If the feedback module 150 receives a signal 201 that coverage is complete (Y) then it may indicate completion by way of the display 2, otherwise (N) the module 150 continues to render the CAD model.

When using an automatic measuring device, the feedback module 150 is not necessarily connected to a display device but may additionally or alternatively be connected to some other devices linked to the measuring device. For example, it may be linked to the controller of the measuring device 304, 306. In this case, the rendering computation 151 computes the region that needs to be further acquired and the rendering engine 152 converts this region to a measuring device location that is sent 300 to the controller. The controller then moves the measuring device 304, 306 to the given location and proceeds to an additional acquisition. In an alternative workflow, the rendering engine 152 simply provides the rendering information or part of the rendering information that an external device or program whose responsibility is to control the measuring device. These programs, also called "path programming" programs are known in the art.

The feedback module 150 may run synchronously with the coverage module 140 and render the rendering information every time coverage data is received. Alternatively, the feedback module 150 may be asynchronous. For example, the rendering 152 may be performed at a given frequency. Also, the rendering engine 152 may be utilised only when the rendering information 151 sufficiently differs from the previous rendering information. In still another alternative, the rendering engine 152 may be utilised when the operator provides an instruction thereto, for example, by pressing a button (located on the keyboard, or on the measuring device).

During the acquisition, the user typically paints on the surface of the object as if he would be painting the object. The speed at which the information is acquired, and the order of the information is not relevant to the invention; the required resolution is achieved regardless. The acquired data is then transferred to the coverage module 140 that will in turn update the coverage information and send the update information to the feedback module 150. Regularly, during the acquisition process, the user may decide to check on the screen which portions of the object remain to be acquired. In this process, he may be guided by interacting with the feedback module. The feedback module may zoom or rotate toward the portions where additional data needs to be acquired.

The covering information may be computed by the coverage module 140 using various methods. For example, if the CAD model is an STL model with triangles, each triangle is assigned an integer value P. Each acquired point is first projected onto the closest triangle and the value P of the triangle is incremented. It may be decided that the triangle is fully covered when P exceeds a certain threshold (say 10 points). This threshold may be hard-coded, given by the user or computed by the coverage module. It may be fixed for all triangles or depend on the area of the triangle or depend on the local curvature of the triangle. The value P may be incremented by other values than 1. If 3 points located on a line are projected onto the same triangle, the coverage module may choose not to increment at all when receiving the 3rd point since it does not provide additional geometrical information. If the user requested a point density of 1 point every millimeter, the covering information may have the form of a regular grid of 1 $mm^2$ squares distributed on the surface of the CAD model where each square is assigned a value of either 0 (not covered) or 1 (covered).

If additional probes are present, the coverage module 140 may use the data acquired by the additional probes to update the covering information. For example, the availability of colour information in a triangle may be used to modify the integer value P of this triangle.

If additional information such as GD&T information is also present in the CAD model, it can be used to compute the covering information. For example, if during inspection, the position of a planar surface must be calculated, a few points are required on this surface to detect the plane. If the planarity of the surface is also necessary, more points must be acquired. The number of points may also depend on the tolerance given in the GD&T information. The coverage module 140 may compute the number of points a priori or adapt the number of points during acquisition based on the already acquired points on the plane.

Other types of methods can be used to define the covering information: more than one threshold may be used; a continuous function may be defined on the triangle hence defining different covering information in each point of the triangle. Also, when a point is projected on a triangle, it may also modify the coverage information of neighboring triangles. Alternatively, a point may be projected on more than one triangle.

When other types of CAD model are used, covering information may be assigned to individual points, to edges, to features or to surfaces. The covering information may be defined on 2D surfaces, 1D edges or individual points.

When receiving data from the measuring device, the coverage module 140 calculates whether the coverage is complete 145. For example, when 99% of the triangles have an index P exceeding the threshold. At this moment, the coverage module may send a special signal 201 that coverage is complete. The feedback module may react to this signal, for example by showing a dialog box on the screen notifying the completion of the process. Other types of feedback may be used, not necessarily using the feedback module. For example an audible signal may be given or a green lamp attached to the ceiling may flash. It should be noted that the completion of the acquisition may trigger other type of operations. For example, the numerical representation of the object may be saved to disk or emailed to the person responsible for the inspection. Alternatively, if an inspection software is installed on the computer and is able to run automatically, it may be started. In addition, if the object is placed on a conveyer belt, the conveyer belt may be requested to place the following object in the measuring volume of the measuring device.

The above preferred embodiments has been described using a measuring device comprises of a CMM arm and a laser scanner. Other type of dimensional measuring devices may be used such as the one that use optical localizers and laser scanners (Metris K-Scan, Creaform HandyScan). The user may also use other types of scanners, touch probes or scanning probes as discussed above. A user may use the joystick of a conventional CMM to move a scanner around an object to be acquired. He may also use a Robot CMM arm or any other measuring machines that may be used in a manual way.

The coverage module may be used to give qualitative (e.g. two-tone) or quantitative (e.g. colour scale) coloring to the CAD model. Alternatively, the module may give a geometric definition of the portions of the CAD that remain to be scanned. Therefore, the invention may also be used with automatic measuring devices. During manual acquisition, the feedback module is linked to the computer screen. It can be also linked to the controllers of the automatic measuring devices as mentioned earlier. Based on the coverage information provided by the coverage module, the feedback module may compute the path of the automatic measuring device that can provide data in regions where the coverage is not sufficient. The path information is then sent to the controller. In this automatic mode, only the definition of the measuring device is needed. There already exist software programs that create complex paths for the automatic acquisition of complex objects. However, these software programs create the paths a priori. There is no feedback to update the path once the acquisition has started. These software programs are not fault tolerant and may then fail if, for example, the object is not correctly aligned. In this invention, the path may be defined incrementally by the feedback module since there is a feedback loop.

The display means may be a screen 2, 302 (e.g. LCD, OLED, CRT, plasma) connected to the computer as shown in FIGS. 1 and 6. The location of the display means is preferably in the line of sight of the operator, for example, adjacent to the object being acquired or located in the rear of the scanner unit for viewing by the operator simultaneous with scanning. Other display means may be employed. For example, it may be an image projector, configured to project an image directly on the object being scanned, which image projector may be in a fixed location, for example, on the ceiling of the shop floor or it may be located in the projecting end of the moving probe. Such projectors may be color DSP projectors or laser projectors, such as manufactured by Virtek. Image projection is well known, including how to align an object with the projector (using e.g. an iGPS system) and how to correct the image when the object is not planar. The image may contain color information (e.g. red and green) but also text. When an image projector is used, the user no longer needs to look at a screen during acquisition. He simply needs to "paint" the object as long as some color (for example red) is projected onto it.

In order to further automate the process, the object may be equipped by an RFID label and the computer or the measuring device may be able to read this RFID and in response load the corresponding CAD model.

The preliminary step of aligning the CAD model with the object is not mandatory. The alignment may be computed dynamically as the points are being acquired. During the initial part of acquisition, the number of points may be too low as to provide a good alignment transformation with sufficient certainty. The coverage module hence does not provide any covering information. As more and more are acquired, improved alignment transformations are computed, for example using the well known iterative closest point algorithm (ICP). Once the alignment is sufficient, the coverage module may start providing covering information. It should be noted that contrary to the other existing alignment methods, the automatic alignment need not be very accurate. Indeed, during the inspection task, the accuracy of the alignment influences directly the result of the inspection. In our case, the alignment is only used to obtain and rough correspondence between acquired points and CAD model. A misalignment of a few millimeters is still acceptable.

The coverage module 140 may accept additional information from the measuring device. Such information could be an estimation of the accuracy of the points. Based on this information, it could update the covering information. For example, if acquired points are labeled as having an accuracy of 1 mu, the coverage module may compute that 4 points are sufficient to detect a circular feature. On the other hand, if the points have an accuracy of 25 mu, the module may require 20 points or more and update the coverage information accordingly It should be noted that for reverse engineering activities, a CAD model is not available. Nonetheless, the method can still be used. Indeed, during acquisition, the data obtained can be meshed in real time (as disclosed in U.S. Pat. No. 6,616,617) and the mesh can then be used to provide an approximation of the CAD model. If the user requested a given point density, the triangles may be directly coloured depending on their sizes. If a curvature dependant density is preferred, the coverage module may first compute an approximate value of the curvature depending on the succession of stripes.

For a reverse engineering task for the film industry, for example, the color may be important. Therefore, the coverage module may also check that the color sampling of the object is sufficient, using data obtained from a color camera simultaneous with data obtained from the measurement probe. Alternatively, the corrosion analysis of a pipeline requires information of the wall thickness at sufficient intervals. The coverage module may thus take the thickness information into account when computing the coverage information.

The above description has been made by assuming that the acquisition data of the measuring devices are points. Of course, the above method can be extended to other types of data such a polygons, range images, voxels from CT scans. The coverage module computes whether the data is sufficient to perform the various inspection or reverse engineering tasks with sufficient accuracy. It is not needed to perform the actual inspection or reverse engineering. For example, using CT data, the coverage module verifies the voxel size and density distribution on the voxels. Based on this information, the coverage module may estimate that the subsequent surface reconstruction will be sufficiently accurate to allow the detection of features. If only features are needed during the inspection task, the coverage module then notifies that the covering is complete.

The coverage module 140 may be incorporated into a microprocessing unit located in the base of the measuring device. The communication to the measurement device and the feedback module may be wireless. The computation of the 3D position of the points may be located in the base 7 and not on the computer 1.

Prior to the acquisition, regions of the CAD model may already show that the resolution is sufficient, for example if no data is required in these regions for the inspection process or if data has already been previously acquired (maybe with another measuring device)

The above method can also be applied with 2D measuring devices (such a profilometers) and 2D CAD models or 2D sections of 3D models.

For every point, the coverage module 140 updates the covering information. If the covering information does not change or is only updated slightly, this means that the particular does not add information. This may happen if the point is a duplicate of an already acquired point, or is the region was already sufficiently acquired. When this happens, the point need not be kept in the point cloud and may be readily discarded. Therefore, the total size of the pointcloud may be controlled even in the event that the operator passes several times over the same region of the object.

The invention claimed is:

1. A method for the dimensional acquisition of an object at a resolution sufficient for a subsequent inspection task using a dimensional measurement device manually directed over the object by an operator, comprising the steps:
    a) manually directing the measurement device over regions of the object to acquire their dimensions,
    b) providing during acquisition, on a nominal computer aided design (CAD) model of the object,
    an indication to the operator of whether the resolution of the regions acquired by the measurement device is sufficient or insufficient according to predetermined criteria set by the operator prior to acquisition, whereby said sufficient resolution provides enough data for the subsequent inspection task, and insufficient does not,
wherein regions where no data have been acquired are indicated on the CAD with a marking,
acquired regions of sufficient resolution are indicated on the CAD model using a first alternative marking, and
acquired regions of insufficient resolution are marked on the CAD model using a second alternative marking that is different from the first alternative marking,
c) re-directing the measurement device over the acquired regions indicating insufficient resolution for the subsequent inspection task,
d) updating the indication of the resolution of the acquired regions on the CAD model, and
e) repeating steps c) and d) until sufficient resolution for the inspection task is indicated on the CAD model,
thereby acquiring the dimensions of the object at sufficient resolution for the subsequent inspection task.

2. Method according to claim 1, wherein the CAD model and indication of resolution for acquired regions of the object are displayed using a display means.

3. Method according to claim 1, wherein the indication of resolution is updated after the measurement device acquires a region that at least partially overlaps a previously acquired region.

4. Method according to claim 1, wherein the measurement device is a manually operated measurement device.

5. Method according to claim 1, wherein the measurement device comprises an optical scanner and either a co-ordinate measuring machine, CMM, arm or an optical CMM.

6. A computer program stored on a non-tangible computer readable medium, for the dimensional acquisition of an object at a resolution sufficient for a subsequent inspection task by a manual dimensional measurement device that is directed over the object, configured to:
a) receive three-dimensional data of the object from the measurement device directed over regions of the object,
b) provide during acquisition, on a nominal computer aided design (CAD) model of the object, an indication to the operator of whether the resolution of the regions acquired by the measurement device is sufficient or insufficient according to predetermined criteria set by the operator prior to acquisition, whereby said sufficient resolution provides enough data for the subsequent inspection task, and insufficient does not,
wherein regions where no data have been acquired are indicated on the CAD with a marking,
acquired regions of sufficient resolution are indicated on the CAD model using a first alternative marking, and
acquired regions of insufficient resolution are marked on the CAD model using a second alternative marking that is different from the first alternative marking,
c) receive additional three-dimensional data of the object from the measurement device for the acquired regions indicating insufficient resolution for the subsequent inspection task,
d) update the indication of the resolution of the acquired regions on the CAD model, and
e) repeat steps c) and d) until sufficient resolution for the subsequent inspection task is indicated on the CAD model.

7. Computer program according to claim 6, comprising a coverage module configured to receive the three-dimensional data of the object from the measurement device during dimensional acquisition, and to provide the updated indication of the resolution of the acquired regions.

8. Computer program according to claim 7, further comprising a feedback module configured to provide said indication of resolution to the acquired regions from the coverage module onto a CAD model.

9. Computer program according to claim 8 wherein acquired regions of sufficient resolution are indicated on the CAD model using a first marking, and acquired regions of insufficient resolution are marked on the CAD model using a second marking that is different from the first marking.

10. Computer program according to claim 6, further comprising a display means to display the resulting CAD model.

11. Computer program according to claim 6, further comprising a sub-routine to indicate when the dimensional acquisition of the object to a sufficient resolution for the subsequent inspection task is complete for all acquired regions of the object.

12. Computer program according to claim 6, wherein the feedback module runs synchronously or asynchronously with the coverage module.

* * * * *